No. 772,848. PATENTED OCT. 18, 1904.
R. B. TEACHOUT.
HOT WATER HEATING SYSTEM.
APPLICATION FILED DEC. 12, 1903.
NO MODEL. 4 SHEETS—SHEET 4.

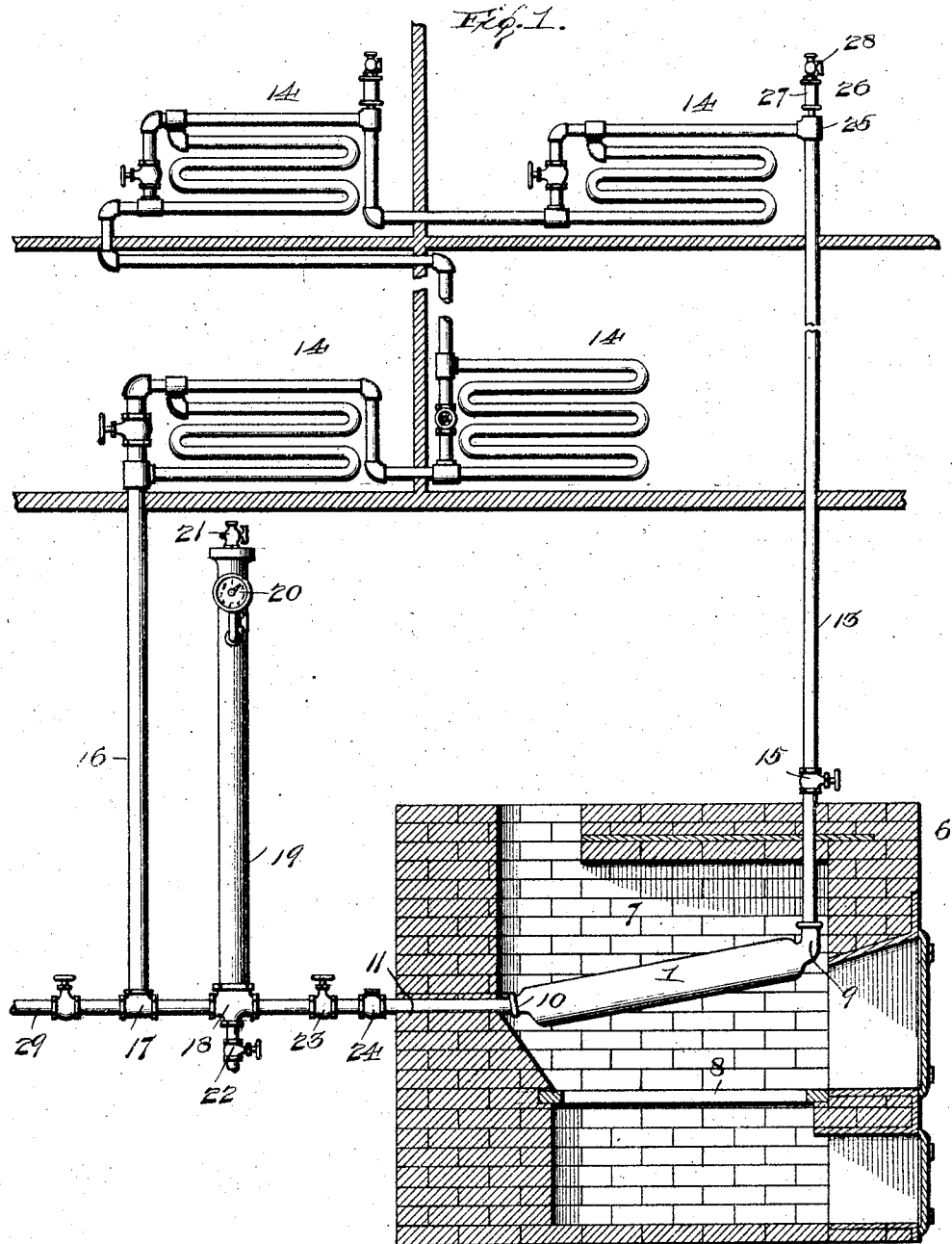

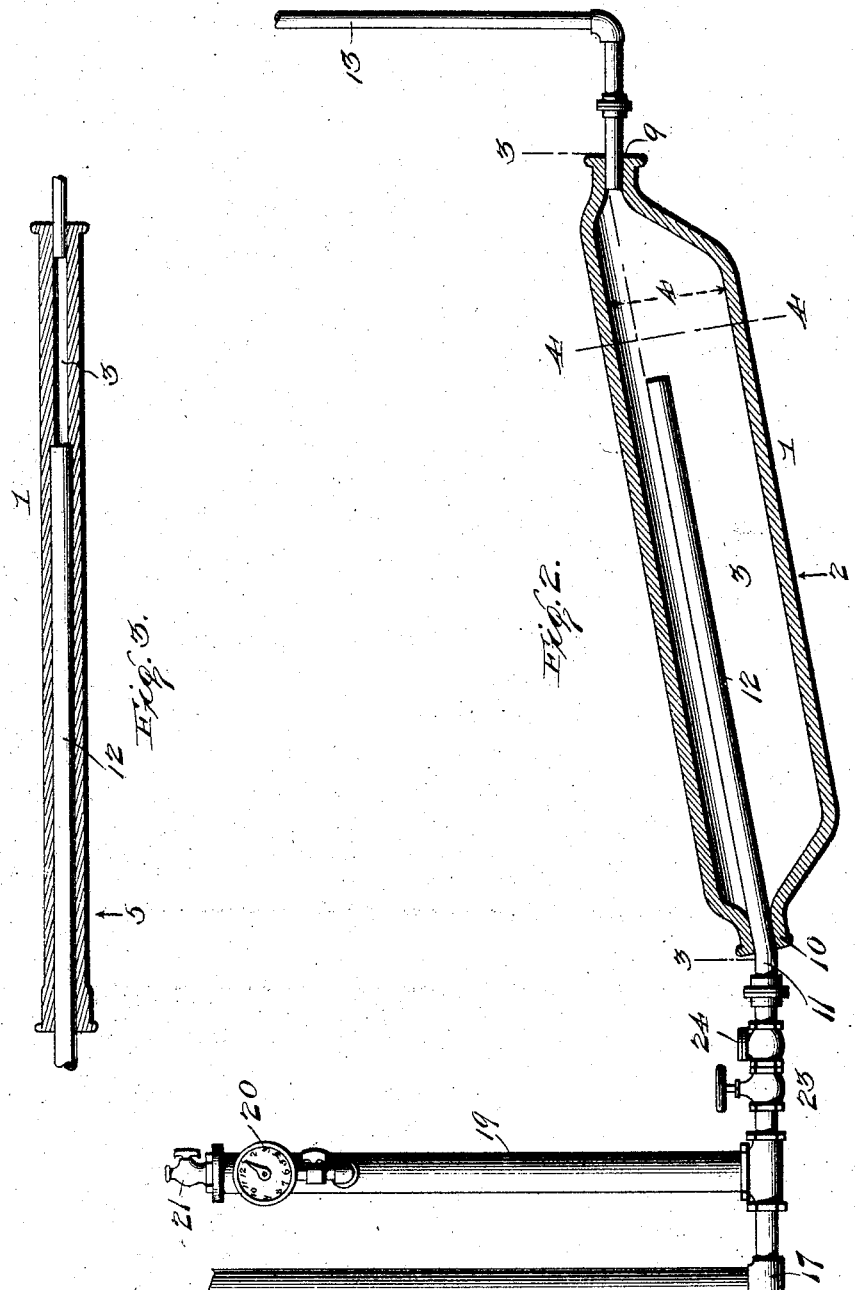

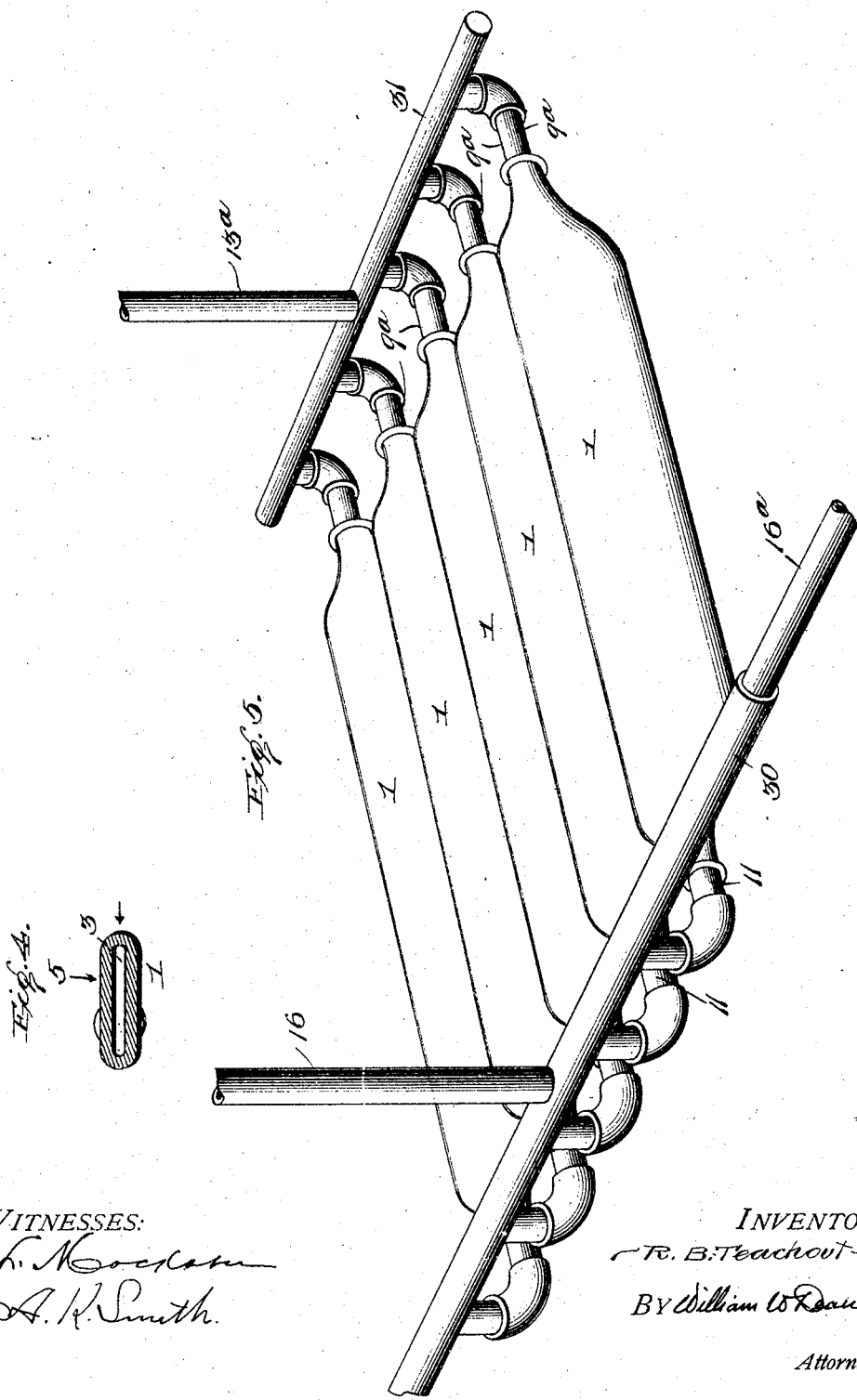

WITNESSES:

INVENTOR
R. B. Teachout
BY William W. Deane
Attorney

No. 772,848.                                    Patented October 18, 1904.

UNITED STATES PATENT OFFICE.

ROYAL B. TEACHOUT, OF PETOSKEY, MICHIGAN.

HOT-WATER HEATING SYSTEM.

SPECIFICATION forming part of Letters Patent No. 772,848, dated October 18, 1904.

Application filed December 12, 1903. Serial No. 184,948. (No model.)

*To all whom it may concern:*

Be it known that I, ROYAL B. TEACHOUT, a citizen of the United States, residing at Petoskey, in the county of Emmet and State of Michigan, have invented certain new and useful Improvements in Hot-Water Heating Systems, of which the following is a specification.

This invention relates to heating systems for buildings, and has special reference to an improvement in that class of apparatus commonly known as "hot-water heating" systems.

To this end the invention has in view an improvement in the form of the heater proper to insure a most effective heating and circulation of the hot water, while at the same time providing for the feeding and return, respectively, to and from the radiators in such a manner as to insure perfect safety through a proper balancing of pressures.

A further object of the invention is to provide means in connection with the system for insuring the complete escape of any air in the piping or radiators and also obviate the water-hammer, which is a common source of annoyance in systems of this character.

With these and many other objects in view, which will more readily appear as the nature of the invention is better understood, the same consists in the novel construction, combination, and arrangement of parts, which will be hereinafter more fully described, illustrated, and claimed.

The essential features of the invention involved in the peculiar structure of the heater proper and the novel arrangement of the piping in connection with an air-chamber or pressure-controller are necessarily susceptible to structural modification without departing from the scope of the invention; but a preferred embodiment of the latter is shown in the accompanying drawings, in which—

Figure 6:
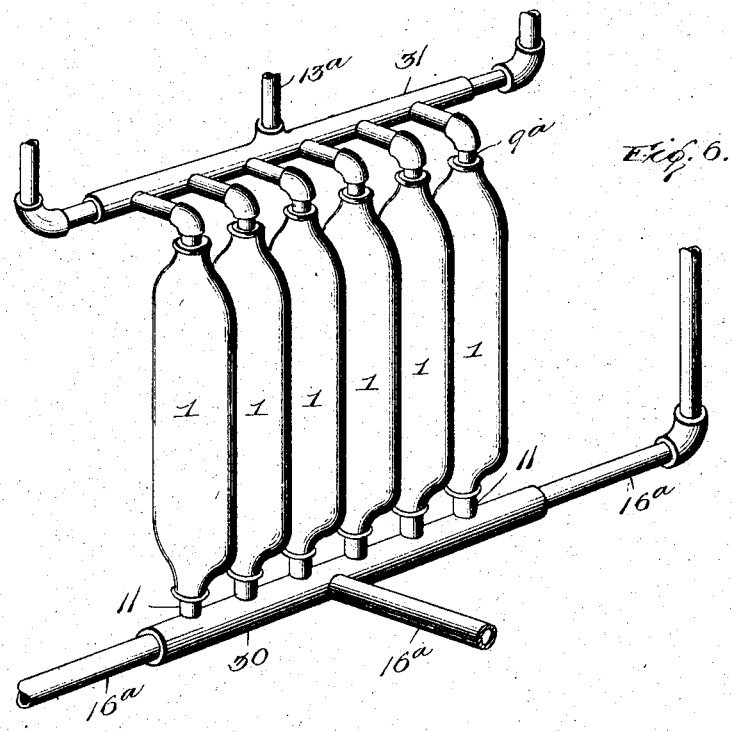
Figure 7:
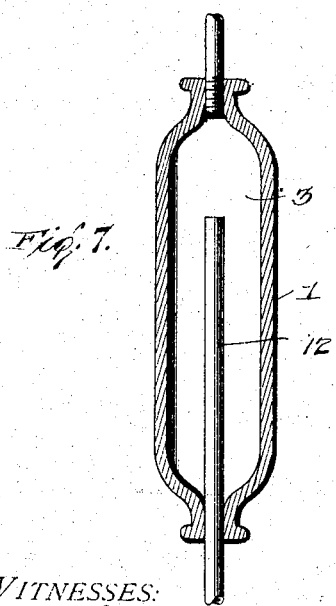
Figure 8:
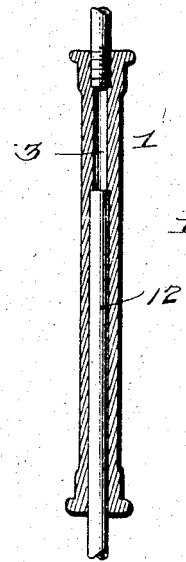

Figure 1 is a general elevation illustrating the apparatus associated with a plurality of radiators connected in series and embodying a single heater proper or heating-bar. Fig. 2 is an enlarged detail sectional view of the peculiarly-formed heater or heating-bar, illustrating the pipe connection associated directly therewith. Fig. 3 is a detail longitudinal sectional view of the heater or heating-bar on the line 3 3 of Fig. 2. Fig. 4 is a similar cross-sectional view on the line 4 4 of Fig. 2. Fig. 5 is a fragmentary perspective view showing a modification of the apparatus, embodying a row or series of the heaters or heating-bars to provide increased circulating capacity, according to the building to be heated. Fig. 6 is a view similar to Fig. 5, illustrating another modification, wherein a series or group of the heater or heating-bars are embodied, arranged in a perpendicular or upright position. Figs. 7 and 8 are longitudinal sectional views of one of the perpendicular upright heaters shown in Fig. 6.

Like reference-numerals designate corresponding parts in the several figures of the drawings.

In carrying out the invention a distinctive feature thereof resides in the employment of a heater of peculiar form. In Figs. 1 and 2 of the drawings this heater is designated in its entirety by the numeral 1, and essentially consists of an oblong flattened tubular heating-bar of a bellied formation in the direction of its width, as at 2, and pierced longitudinally by a constricted bore 3, necessarily of a narrow or capillary width on account of the narrow form or thickness of the bar. This constricted flattened bore 3 pierces the heating-bar 1 longitudinally throughout its entire length and has its greatest width from top to bottom of the bar, as indicated by the dotted line 4 in Fig. 2. The extreme narrowness of the bore in a lateral direction, as indicated by the line 5 in Figs. 3 and 4 of the drawings, provides a narrowed water-space for holding and circulating the water in sheet form, thus bringing the entire body of water as nearly as possible in contact with the heated surfaces of the heater or heating-bar, thus insuring a rapid and thorough heating of the water, with a consequent strong and steady circulation throughout the piping and radiators of the system.

The heater or heating-bar 1, either singly or in groups, as hereinafter explained, is designed to be associated with any suitable type of furnace, such as the furnace 6. (Shown in the drawings.) This furnace is provided with an interior inclosed fire-chamber 7, within which and above the grating 8 is designed to be suitably supported the heating-bar 1. It is preferable in carrying out the invention to arrange the heating-bar obliquely or at an angle within the fire-chamber 7, so that its discharging neck or opening 9 will be at a higher elevation than the inlet neck or opening 10, which latter neck or opening is designed to have connected therewith the intake-pipe 11 for the heater or heating-bar. Also in direct communication with the pipe 11 and extending inward from the neck or opening 10 is an interior feeding-tube 12, which projects inwardly within the constricted bore or passage 3 for about two-thirds of the length of the heater or heating-bar, whereby the water which enters the heating-bar is fed therein at a point well up toward its delivering or discharging end, and therefore has a tendency to circulate or run back toward the lower end until it has been heated sufficiently to gather sufficient circulating force to pass upward through the heating-bar and out of the discharge neck or opening 9 thereof into the hot-water feed-pipe 13.

The hot-water feed-pipe 13 constitutes the delivery or discharge pipe for the heater or heating-bar and has suitable branch connections with any desirable number of radiators 14 located in the building to be heated. Said pipe may be provided with a suitable globe or cut-off valve 15 for cutting off the circulation therethrough whenever desired.

The radiators 14 are connected in a series in the usual way and have a common return through the main return-pipe 16. This main return-pipe 16 has a connection 17 with the intake-pipe for the heating-bar, and at a point between said connection and the inlet neck or opening 10 the said pipe also has coupled thereto, as at 18, an upright air-chamber 19, provided at its upper end with a presure gage or indicator 20 and a vent-cock 21. At its lower end the air-chamber 18 is provided with a valved blow-off connection 22. Between the air-chamber 19 and the inlet neck or opening 10 the intake-pipe also has fitted thereto a suitable globe or cut-off valve 23 and a check-valve 24, the latter being located nearest the heating-bar or heater to prevent back flow or circulation in a direction toward the air-chamber.

At the highest point in the system—that is, at the highest point of the highest radiator—the piping at such place has suitably coupled thereto by means of a coupling 25 a system vent 26. This system vent essentially consists of a chamber 27, having a suitable nipple connection with the coupling 25, and at its upper end is provided with a vent-cock 28, which by being opened permits of the escape of any air in the radiators or piping. Furthermore, the entire system may be filled or refilled with water by removing the vent 26 and pouring in the water at such point, and by leaving the chamber 27 of such vent filled with water and the cock 28 opened a vent or escape for air is permitted, while at the same time the common annoyance of the "water-hammer" is entirely obviated. A valved water-supply pipe 29 may be connected with the intake-pipe 11, as illustrated in Fig. 1, to provide a water-supply for baths, &c., as well as for filling purposes.

It will be obvious that by reason of an air-chamber 19 being interposed in the pipe between the common return 16 and the heating-bar any undue pressure or expansion in the water is compensated for by the air-chamber, into which the water has a tendency to rise. At the same time the compression of air in said chamber serves to balance and equalize the pressure throughout the entire system.

Various modifications of the invention may be resorted to, such as suggested in Fig. 5, wherein is shown a series or group of the heating-bars 1. In this arrangement the intake-pipes 11 for the bars are connected to a return-header 30, common to all of the bars, and having the radiator return-pipe connections 16ª therewith. At their other ends the heating-bars 1 have discharge-pipe connections 9ª with a delivery-header 31, common to all of the bars, and having connected therewith the hot-water feed-pipe 13ª for the system. A similar modification is shown in Fig. 6, which is the same in all respects as that shown in Fig. 5, excepting that the series or group of heating-bars are arranged perpendicular or in upright position instead of substantially horizontal, as indicated in Fig. 5. In all modifications, however, the same essential features are preserved.

From the foregoing it is thought that the construction and operation and the many advantages of the herein-described hot-water heating system will be readily apparent without further description, and it will be understood that various changes in the form, proportion, and minor details of construction may be resorted to without departing from the spirit of the invention or sacrificing any of the many advantages thereof.

Having thus described the invention, what is claimed, and desired to be secured by Letters Patent, is—

1. In a hot-water heating system, a water-heater consisting of a flat heating-bar provided with a constricted longitudinal space within it for holding water in sheet form, said bar being located in the furnace with its major axis in a vertical plane and inclined as described, and pipe connections with said bar.

2. In a hot-water heating system, a water-heater consisting of a flat heater-bar obliquely disposed within the furnace and having its major axis in a vertical plane, and a feeding-tube extending into the lower end of the bar and partially through the same.

3. In a hot-water heating system, a water-heater consisting of a flat heater-bar obliquely disposed within the furnace and having its major axis in a vertical plane, and the pipe connections at the ends of the bar being attached above the longitudinal center of the bar.

4. In a hot-water heating system, a water-heater comprising a series of flat heater-bars obliquely disposed within the furnace and with their major axes in a vertical plane, pipe connections at the ends of the bars, the feeding-pipes extending into the lower ends of the bars and partially through said bars in an inclined direction, for the purpose described.

In testimony whereof I affix my signature in presence of two witnesses.

ROYAL B. TEACHOUT.

Witnesses:
 HENRY GATES,
 W. A. SEEGMILLER.